United States Patent [19]

Juri et al.

[11] Patent Number: 5,574,568
[45] Date of Patent: Nov. 12, 1996

[54] VIDEO RECORDING AND REPRODUCING APPARATUS

[75] Inventors: Tatsuro Juri, Osaka; Eiji Yamauchi, Katano, both of Japan

[73] Assignee: Matsushita Electric Industrial Co., Ltd., Osaka, Japan

[21] Appl. No.: 241,002

[22] Filed: May 11, 1994

[30] Foreign Application Priority Data

May 12, 1993 [JP] Japan ................................. 5-110354
May 14, 1993 [JP] Japan ................................. 5-112865

[51] Int. Cl.⁶ ........................................... H04N 5/945
[52] U.S. Cl. ........................ 386/112; 348/423; 386/116
[58] Field of Search ............................ 358/336, 314; 348/423; H04N 5/945

[56] References Cited

U.S. PATENT DOCUMENTS

| | | | |
|---|---|---|---|
| 5,247,363 | 9/1993 | Sun | 358/336 |
| 5,267,036 | 11/1993 | Habraken | 348/384 |
| 5,272,528 | 12/1993 | Juri | 348/403 |
| 5,282,049 | 1/1994 | Hatakenaka | 358/335 |
| 5,450,506 | 9/1995 | Gillard | 358/336 |

FOREIGN PATENT DOCUMENTS

| | | |
|---|---|---|
| 0476741 | 3/1992 | European Pat. Off. . |
| 0492537 | 7/1992 | European Pat. Off. . |
| 0498081 | 8/1992 | European Pat. Off. . |
| 3266525 | 11/1991 | Japan . |
| 5003550 | 1/1993 | Japan . |
| 2090106 | 7/1982 | United Kingdom . |

OTHER PUBLICATIONS

W. Chen and C. H. Smith, "Adaptive Coding of Monochrome and Color Images", IEEE Transactions on Communications, vol. COM–25, No. 11, pp. 1285–1292 (1977).

The Journal of the Institute of Television Engineers of Japan, vol. 45, No. 7, pp. 813–819 (1991).

*Primary Examiner*—Howard W. Britton
*Attorney, Agent, or Firm*—McDermott, Will & Emery

[57] ABSTRACT

In a recording apparatus for video signals, adjacent pixels in input image signals are collected as blocks and subjected to orthogonal transformation. Then, the dc component, control data, ac components, end-of-block signal and the like in a block after orthogonal transformation are coded and the codewords are arranged in prescribed record areas. One or a plurality of record areas forms a correction area, and error correction coding is performed and recorded on the data in a correction area. When record data are reproduced and recorded again, errors are detected in the unit of the error correction area. The dc component and the like in a record area wherein an error which cannot be corrected exists are replaced by a codeword which is not used ordinarily, and a codeword for the first ac component is replaced by an end-of-block codeword.

25 Claims, 5 Drawing Sheets

VIDEO RECORDING AND REPRODUCING APPARATUS

BACKGROUND OF THE INVENTION

1. Field of the Invention

The present invention relates to recording and reproducing apparatus for recording and transmitting video signals with an efficient coding.

2. Description of the Prior Art

Video compression coding is known as a technique used for reducing a data quantity of video signals. In a known video compression coding, a block is composed of neighboring pixels, and video signals in each block are compressed by orthogonal transformation. Orthogonal components obtained by the orthogonal transformation are processed with a variable length coding. Then, they are recorded or transmitted.

The recorded orthogonal components of variable length coding is decoded on reproduction. When an error happens on reproducing the recorded video signals, error propagation occurs due to variable length coding. Therefore, an error of one bit causes large deterioration of image quality on reproduction. If a record area of fixed length is assigned for each block, error propagation is suppressed at minimum. However, when reproduced data are recorded again, the data are processed with a variable length decoding, errors are corrected and the corrected data are recorded with a variable length coding. Then, a scale of a recording circuit therefor increases because it is needed to carry out variable length decoding and variable length coding at the same time.

SUMMARY OF THE INVENTION

An object of the present invention is to provide a reproduction apparatus which can process errors on reproduction recorded video signals simply.

Another object of the present invention is to provide recording and reproduction apparatuses which can prevent enhancement of error propagation on recording and reproduction.

The present invention relates to reproduction data which the data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes. In one aspect of the present invention on reproducing and recording video data, the data are reproduced from an error correction area, and an error is detected which cannot be corrected exists in data in an error correction area and a position of the error is detected. Then, either a dc component in the recording area or a codeword for a control data needed for decoding the data in a block is replaced with a prescribed codeword, and a codeword for a first ac component is replaced with an end-of-block code if an error which cannot be corrected is detected in the block. The data processed as described above are recorded.

In a second aspect of the present invention, the data are reproduced from an error correction area, and an error is detected which cannot be corrected exists in data in an error correction area, and the position of the error is detected. Either a dc component in the recording area or a codeword for a control data needed for decoding the block is replaced with a prescribed codeword, and a codeword for a first ac component is replaced with an end-of-block code for the block wherein an error which cannot be corrected is detected and the error is one of a dc component, control data needed for reproduction of the block and ac components at frequencies lower than a prescribed frequency. Then, an end-of-block codeword is inserted for a block wherein an error which cannot be corrected is detected and the error is one of ac components higher than a prescribed frequency or an end-of-block codeword. Thus, the data are recorded after inserting the end-of-block codeword.

In a third aspect of the present invention, when the data explained above which have reproduced and recorded again are reproduced, it is detected that the dc component has been replaced previously in an error correction area. Then, decoding is operated by using an end-of-block codeword which appears in a record area on which it is detected that the dc component has been replaced previously or by using codewords included in a record area on which it is detected that the dc component has been replaced previously. Then, the data are corrected in a block on which the dc component has been replaced in the record area.

An advantage of the present invention is that when reproduced data are recorded again, it can be recorded that an error exists in a block by replacing a dc component with a special codeword in a record block wherein the error happens.

Another advantage of the present invention is that when reproduced data are recorded again and a codeword for a first ac component is replaced with an end-of-block codeword in a record block wherein the error happens, all ac components in a block wherein an error happens can be decoded as zero automatically in a variable length decoding on reproduction.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
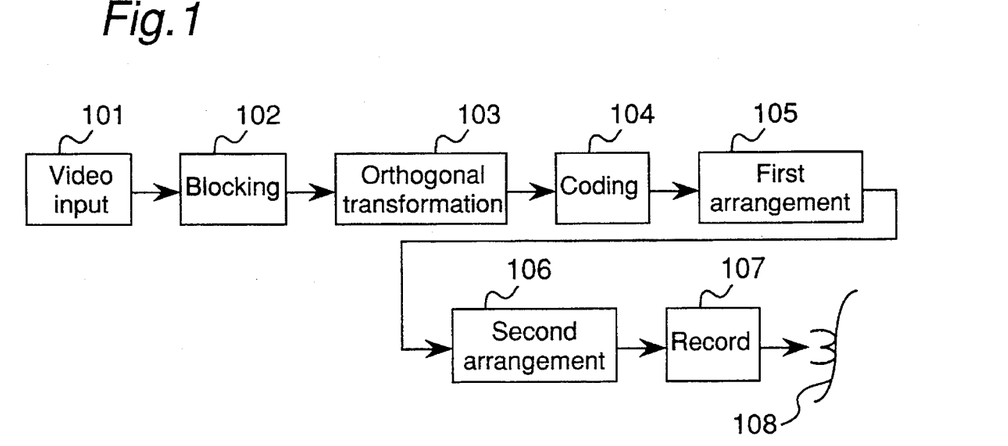
FIG. 1 is a block diagram of a video signal recording apparatus.

Referring now to the drawings, wherein like reference characters designate like or corresponding parts throughout the several views, a video signal recording apparatus of an embodiment of the present invention records video signals. FIG. 1 shows a block diagram of a video signal recording apparatus which records video signals, and it comprises a video signal input section 101, a blocking section 102, an orthogonal transformation section 103, a coding section 104, a first arrangement section 105, a second arrangement section 106 and a recording section 107.

Figure 2:
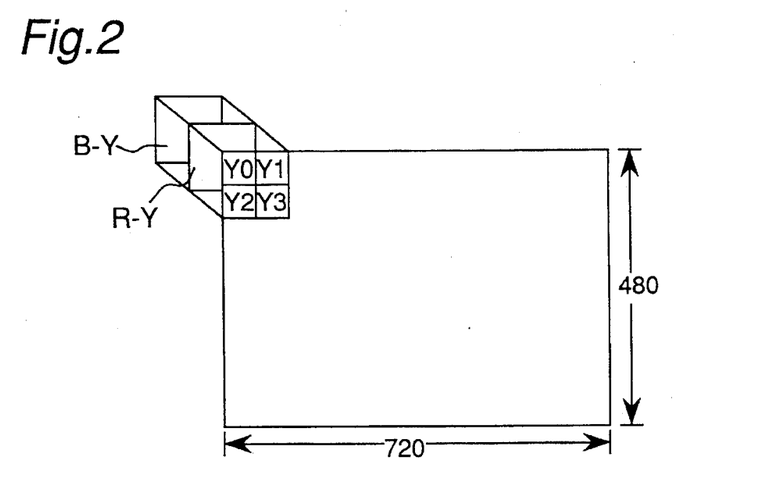
FIG. 2 is a diagram for illustrating blocks and macro blocks.

The blocking section 102 forms blocks each of 64 pixels from video signals received from the video signal input section 101. Video signals consist of for example luminance signals and two color signals R-Y and B-Y. Luminance signal data of a frame (say 720 pixels along a horizontal direction and 480 pixels along a vertical direction) are divided into blocks each made of 64 pixels of 8 pixels along a horizontal line and 8 lines along a vertical line. As shown in FIG. 2, the two color difference signals (R-Y and B-Y) form orthogonal transformation blocks of pixels contained in the same area on screen as four adjacent blocks Y0, Y1, Y2 and Y3 of luminance signals. Six block of four blocks Y0, Y1, Y2 and Y3 of luminance signals, a block of R-Y signals and a block of B-Y signals located in the same position on screen are called as a macro block. Though a macro block consists of six blocks in the present embodiment, it may have a different number of blocks.

The video signals are recorded after video compression coding as explained below. The orthogonal transformation section 103 operates orthogonal transformation of the video signals for each block defined by the blocking section 102. A discrete cosine transform (DCT) is normally applied as orthogonal transform in this embodiment. However, a wavelet transform or the like can also be applied.

Figure 3:
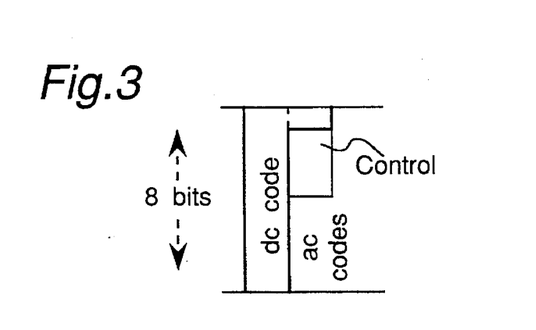
FIG. 3 is a diagram of orthogonal transformation data.

The coding section 104 operates coding on the data after orthogonal transformation consisting of a dc component and ac components, as shown in FIG. 3. The dc component is subjected to a fixed length coding, while ac components are subjected to a variable length coding. The ac components are arranged successively from low frequency components which are important for vision and they are subjected to variable length coding. Further, if alternating current components in a block are all zero after a non-zero alternating current component, as an end-of-block codeword (EOB) is placed at a position of the top of the successive zeros. Further, control data and the like needed on decoding for the block are also coded at the same time.

Figure 4:
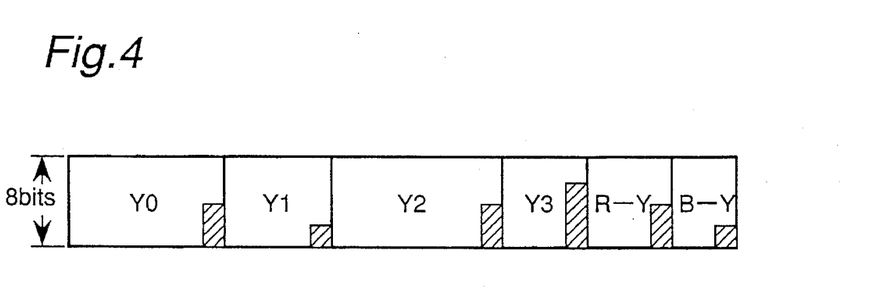
FIG. 4 is a diagram of coded data of six blocks in a macro block.

Blocks coded as explained above are sent to the first arrangement section 105. FIG. 4 shows an example of data quantities of six blocks, luminance blocks Y0–Y3 and color difference blocks R-Y, B-Y, in a macro block after coding by the coding section 104. As shown in FIG. 4, the data quantities in the six blocks are different among blocks due to variable length coding. In FIG. 4, shaded regions in each block represent vacant area not storing data in the last byte.

Figure 5:
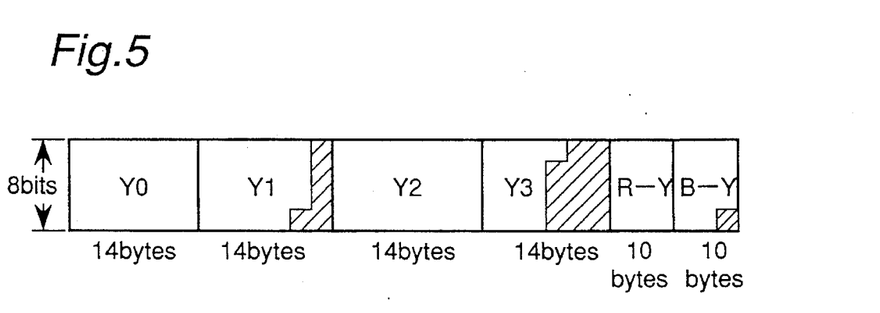
FIG. 5 is a diagram of record areas of the video signal recording apparatus.

FIG. 5 shows a record format wherein record areas for the six blocks are fixed in order to prevent error propagation. In the present example, record areas for luminance blocks Y0–Y3 are set as 14 bytes and those for blocks of color difference signals R-Y, B-Y are set as 10 bytes. In the example shown in FIG. 5, data of blocks Y0, Y2 and R-Y are too abundant to overflow data. On the other hand, data of blocks Y1, Y3 and B-Y are not abundant enough to fill the fixed record areas completely, and the record areas have empty regions represented as shaded areas. In the first arrangement section 105, a record area of a prescribed memory capacity is secured for each block as described above, and arranges data for each block so that a dc component of a block in correspondence to a record block and a codeword for control data needed on decoding the block are arranged in a fixed position in the record area and codewords for ac components and an end-of-block codeword cannot be arranged in the record area, the codewords or a part thereof overflown from the record area are combined as overflown data with similar overflown data from the other record areas.

Next, the second arrangement section 106 arranges the overflow data from the blocks Y0, Y2 and B-Y in the record areas for the block Y1, Y3 and B-Y having empty regions. Thus, all record areas can be used efficiently. Then, the record section 107 records the code data in a magnetic tape.

Figure 6:
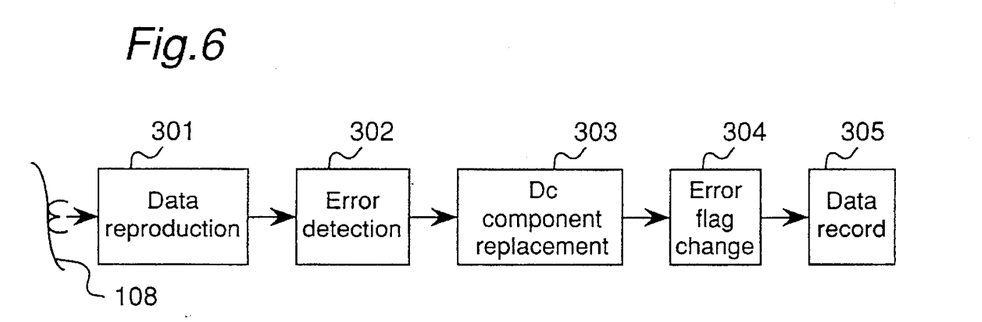
FIG. 6 is a block diagram of a first recording apparatus.

FIG. 6 shows an embodiment of an recording and reproducing apparatus which reproduces data recorded as explained above by the recorder and records reproduced data again. In the apparatus, data recorded by the recorder in the format as described above are recorded after error correction coding in each record area for a macro block shown in FIG. 5 (record area for six blocks). A unit for error correction coding is called as an error correction area, and an error flag for representing the existence of errors in an error correction area is recorded in the unit of error correction area. The error correction code can detect an error position in the unit of byte.

Then apparatus shown in FIG. 6 comprises a data reproduction section 301, an error detection section 302, a dc component replacement section 303, an error flag change section 304 and a data record section 305. The data reproduction section 301 reproduces data recorded by the recording apparatus shown in FIG. 1 from a magnetic tape. The error detection section 302 receives the reproduction output and corrects and detects errors in the unit of macro block. If the error detection section 302 cannot correct all errors, all positions which may have errors are detected and output in the unit of byte to the dc component replacement section 303. The error detection section 302 sets an error flag in each error correction area.

An example of the error flag is explained next. A 2-bit flag defined below is recorded in each error correction area.

| | |
|---|---|
| "00": | No error exists. |
| "01": | An error exists, but it has been corrected already and there is no effect of the error. |
| "10": | An error exists and an error code is set. |
| "11": | An error exists, but the position thereof cannot be located. |

Usually, "00" is recorded on the first recording and when no error exists. If an error has been corrected or a usual decoding is operated, "01" is recorded. On the other hand, if an error detected cannot be corrected, correction is needed on decoding. If the error flag is "10", data of a block including the error will be corrected. Further, if the error flag is "11", data of all blocks will be corrected.

The dc component replacement section 303 decides a record area which may have errors in the unit of block according to the results of the error detection section 302. For a block which have errors, a codeword which represents the dc component of the block is replaced with a special codeword (hereinafter referred to as error code). The error code is a codeword not used as codewords in orthogonal transformation. For example, if the codeword for the dc component is expressed between −255 to +255, −256 can be used as an error code. Simultaneously, for the block having errors, a codeword of an ac component which is the first in the block is replaced with an end-of-block codeword. Then, all ac components are decoded as zero on variable length decoding because the first codeword to be decoded in the block is an end-of-block codeword.

An example of the dc component replacement is explained next. FIG. 3 shows an example of a record area of a block, wherein first 9 bits (one byte and one bit) in the record area represent a codeword for the dc component, next 3 bits represent a control data needed on reproduction and the others represent codewords for ac components. That is, the dc component and the control data are arranged as fixed 12 bits, while the ac components are arranged thereafter as variable length codes.

Figure 7:
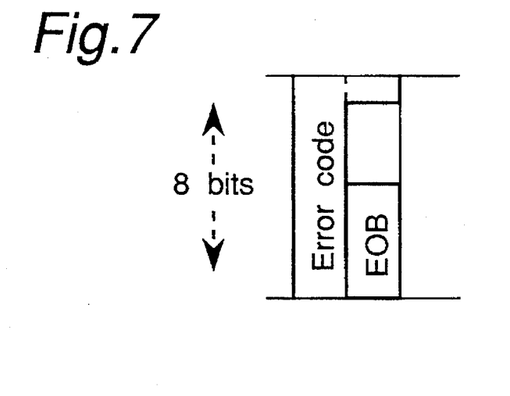
FIG. 7 is a diagram of coded data of six blocks in a macro block after processed by a first arrangement section.

FIG. 7 shows an example of a result of the dc component replacement. The first 9 bits for the dc component codeword is replaced with an error code (for example −256) which means that errors exist in the record area, and the first 4 bits in the area for the ac components which begins at the 12-th bit are replaced with an end-of-block (EOB) codeword of 4 bits. Thus, the dc component replacement is carried out by replacing first 16 bits (2 bytes) in a record area for each block. It is to be noted that data of first two bytes in a record area are replaced only with a fixed bit pattern including the error code, fixed control data pattern and the end-of-block code. Therefore, the dc component replacement can be carried out by a simple circuit. Then, it is possible to operate error correction without using variable length decoding and variable length coding.

Figure 8:
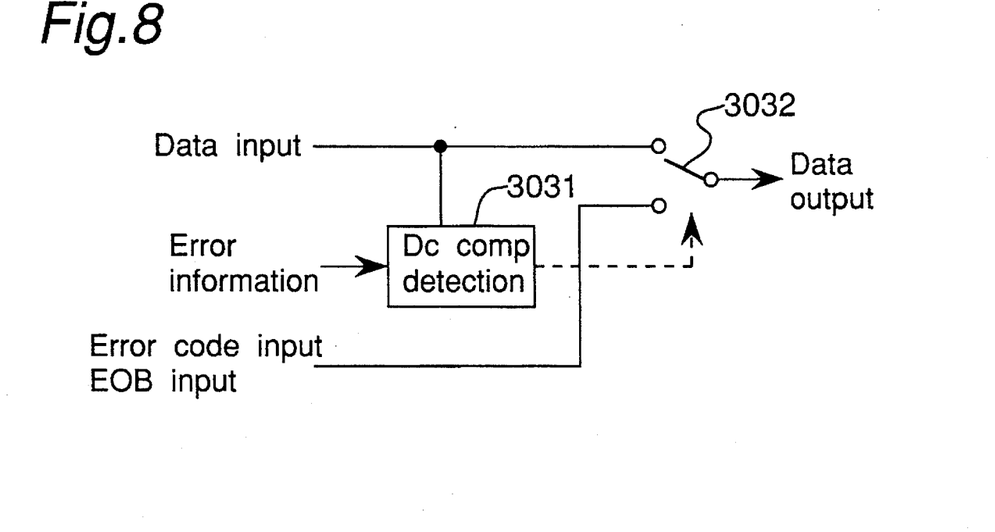
FIG. 8 is an example of a circuit of the dc component replacement section.

FIG. 8 shows an example of a circuit of the dc component replacement section 303. Data received from the error detection section 302 are sent to a dc component detection section 3031 and to a switch 3032. Error code and EOB inputs are also sent to the switch 3032. The dc component detection section 3031 controls the switch 3032 according to an error information received from the error detection section 302 when it detects a dc component.

The error flag change section 304 receives the data which are replaced on the codewords for the dc component and the first ac component in the unit of block as explained above and changes the error codes to codewords which means that errors exist in the error correction area. Finally, the record section 305 records again the reproduced data which have been processed for error correction as described above.

Figure 9:
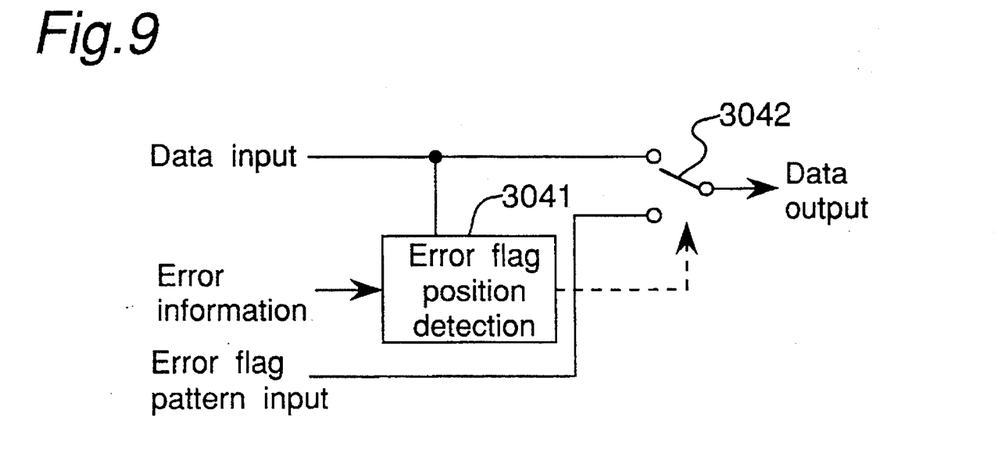
FIG. 9 is a block diagram of an error flag change section.

FIG. 9 shows an example of a diagram of the error flag change section 304. Data received from the dc component replacement section 303 are sent to an error flag position detection section 3041 and to a switch 3042. An error flag pattern input is also sent to the switch 3042. The error flag position detection section 3041 controls the switch 3042 according to an error information received from the dc component replacement section 303 when it detects a dc component.

Figure 10:
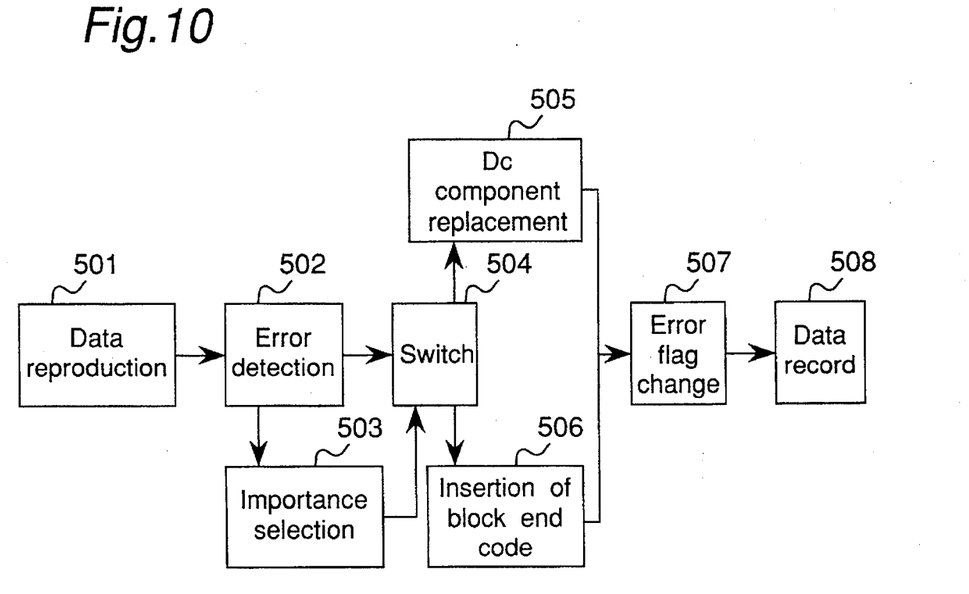
FIG. 10 is a block diagram of a second recording apparatus of an embodiment of the present invention.

FIG. 10 shows a recording and reproducing apparatus of a second embodiment of the present invention, and it comprises a data reproduction section 501, an error detection section 502, an importance selection section 503, a switch 504, a dc component replacement section 505, an end-of-block codeword insertion section 506, an error flag change section 507 and a data record section 508. Similarly to the first embodiment, the data reproduction section 501 reproduces data recorded by the recording apparatus shown in FIG. 1, and the error detection section 502 operates error correction on the reproduced data. If an error cannot be corrected, the error detection section 502 detects a position, wherein the error exists, in the unit of byte.

Figure 11:
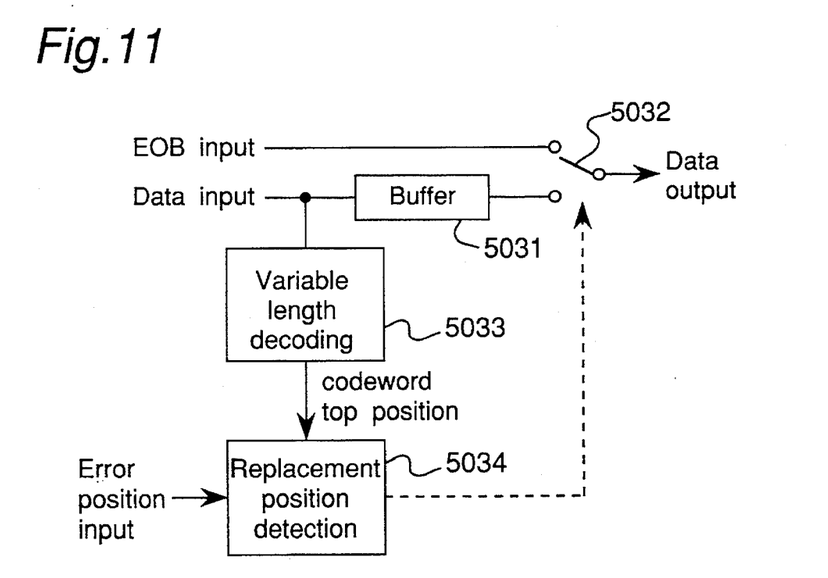
FIG. 11 is a block diagram of a circuit of the importance selection section.

Next, the importance selection section 503 checks importance of the positions of the error which are detected but cannot be corrected by the error correction section 502. FIG. 11 shows an example of a diagram of a circuit of the importance selection section 503. The data from the error detection section 502 are sent through a buffer 5031 to a switch 5032 and to a variable length decoding section 5033 which sends the top position of codewords to a replacement position detection section 5034. An end-of-block (EOB) code is sent to the switch 5032. The replacement position detection section 5034 sends a control signal to the switch 5032 to select the EOB input when it receives an error position input from the error detection section 502.

If an error which cannot be corrected is located in a relatively important data such as the dc component, the control data or an ac component at a low frequency, the reproduced data is sent via the switch 504 to the dc component replacement section 505. Then, as in the first embodiment, the dc component is replaced with an error code, and the codeword for the first ac component is replaced with an end-of-block (EOB) codeword. On the other hand, if an error which cannot be corrected is located in a data which are not so important such as an ac component at a high frequency, the reproduced data is sent via the switch 504 to the end-of-block codeword insertion section 506 to replace a codeword for such a first ac component at a position of a first error in the record area.

The error flag change section 507 receives the data after replacement and changes the error flags to codewords which means that errors exist in the error correction area. The record section 508 records again the reproduced data processed for error correction as described above.

In the second embodiment explained above, if errors which cannot be corrected exist in codewords such as ac components at high frequencies which do not affect image quality, a first codeword which is affected first by errors is replaced with an end-of-block codeword. Then, all decoded as components can be made zero. Therefore, even if errors occur, important data can be used as reproduced, and the effect of errors can be minimized.

Figure 12:
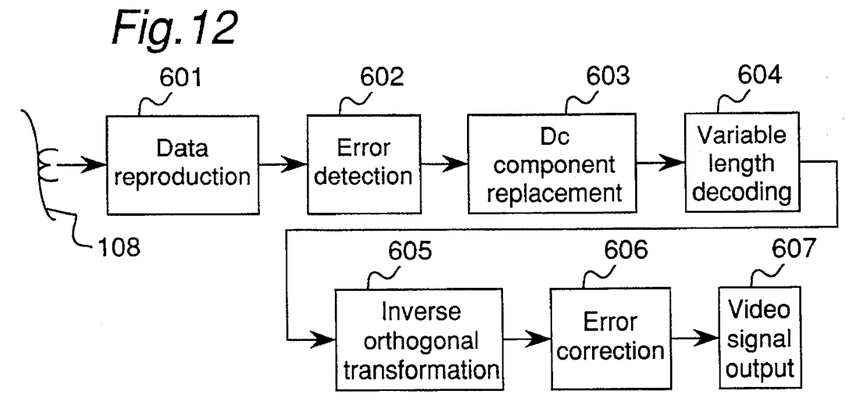
FIG. 12 is a block diagram of an embodiment of a first reproduction apparatus.

Next, reproducing apparatuses according to the present invention are explained. FIG. 12 shows a reproducing apparatus of a first embodiment of the reproducing apparatus of the present invention and it comprises a data reproduction section 601, an error detection section 602, a dc component replacement section 603, a variable length coding section 604, an inverse orthogonal transformation section 605, an error correction section 606 and a video signal output section 607.

The data reproduction section 601 reproduces data from a magnetic tape 108 and sends them to the error detection section 602 which operates error correction. If the error detection section 602 detects errors which cannot be corrected, the dc component replacement section 603 replaces the dc component and the like as in the counterpart 303 in the above-mentioned embodiment.

The variable length decoding section 604 receives data after the replacement processing and decodes data in error correction areas wherein errors which cannot be corrected are detected, by using only data in record areas in correspondence to each block. That is, variable length decoding is operated by using data until either a first end-of-block codeword in the record area or a last codeword in the record area. The codeword data overflowed and recorded in other record areas are not used for decoding. As the dc component is replaced as mentioned above, a decoding output for the dc component in a block for a record area wherein errors are detected is an error code. Because the first ac component is replaced with an end-of-block signal, all ac components is decoded as zero.

The inverse orthogonal transformation section 605 transforms the dc component decoded as explained above to pixel values by using inverse orthogonal transformation. Then, all pixel values in a block for which the dc component replacement is operated is transformed to values (referred to also as error codes) which are not used in inverse orthogonal transformation. The error correction section 606 checks if a receive data has a value not used normally and if an error code is detected, it corrects errors and sends corrected values to the video signal output section 607.

It is to be noted that the error correction section 606 need not receive error data because it can check pixels to be corrected by inverse orthogonal transformation. Therefore, for example a memory for storing error data is not needed, and a circuit scale of the reproducing apparatus can be reduced.

On the other hand, if the dc component received by the inverse orthogonal transformation section 605 is not an error code, a limiter may be provided in the inverse orthogonal transformation 605 to ensure the operation more so as not to generate an error code for the pixel value.

Figure 13:
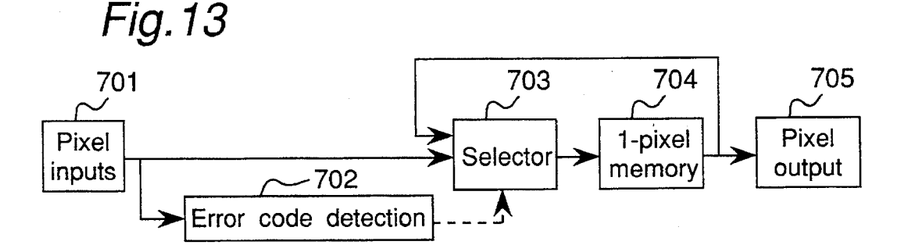
FIG. 13 is a block diagram of a first example of an error correction section.

FIG. 13 shows a first example of the error correction section 606, and it comprises a pixel input section 701, an error code detection section 702, a selector 703, a one-pixel memory 704 and a pixel output section 705. The error code detection section 702 checks if a pixel value received from the pixel input section 701 is an error code or not. If it is decided that it is not an error code, the pixel value is sent via the selector 703 to the one-pixel memory 704. The pixel value stored in the one-pixel memory 704 is sent by the pixel output section 705 at the same time as a next pixel value is received. On the other hand, if the error code detection section 702 decides that it is not an error code, the selector 703 inputs the output value of the one-pixel memory 704 again to the one-pixel memory 704. Thus, if an error code is received, a pixel value just before the receive of the error code is repeated, and this means that the erroneous pixel value (error code) is corrected. In general, a pixel signal having a value not generated by the correction operation may be replaced with a pixel value at an adjacent position in the same field, in one or more fields before or after the present field.

Figure 14:
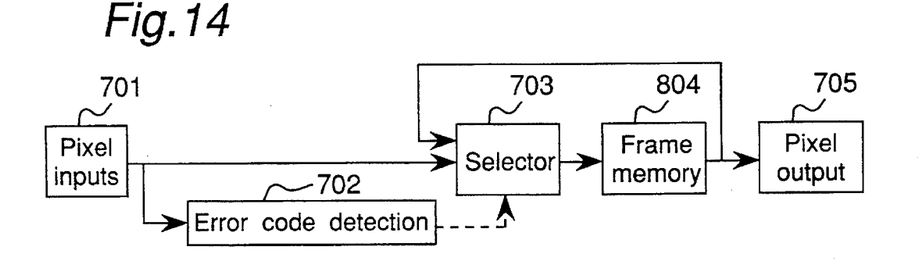
FIG. 14 is a block diagram of a second example of an error correction section.

FIG. 14 shows a second example of the error correction section 606 and it comprises a pixel input section 801, an error code detection section 802, a selector 803, a frame memory 804 and a pixel output section 805. The operation of this example is similar to that of the first example except that when an error code is detected, the frame memory 804 is used to repeat the pixel value in a previous frame. Then, errors can be corrected without nearly deteriorating image quality for a static image or a picture with a small movement.

Figure 15:
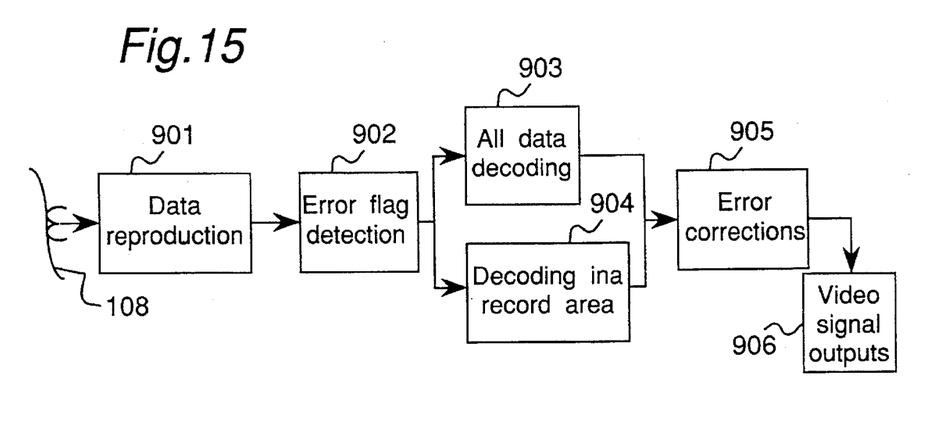
FIG. 15 is a block diagram of an embodiment of a second reproduction apparatus.

Next, an embodiment of a reproduction apparatus used for reproducing data recorded again by using the above-mentioned error correction. FIG. 15 shows a second example of a reproducing apparatus according to the present invention, and it comprises a data reproduction section 901, an error flag detection section 902, an all data decoding section 903, a record area decoding section 904, an error correction section 905 and a video signal output section 906. The data reproduction section 901 reproduced data from a magnetic tape and the error flag detection section 902 received reproduced data and detects errors. If the error flag detection section 902 detects no errors in an error correction area, the all data decoding section 903 operates decoding by using all data in the error correction area similarly to ordinary decoding and sends the result to the error correction section 905. On the other hand, if the error flag detection section 902 detects error flags or it detects that error correction processing such as dc component replacement is performed, the record area decoding section 904 performs decoding only by using data in the record area for each block. In the decoding, only data until either a first end-of-block codeword in the record area or a last codeword in the record area are used, and codewords recorded in record areas for other blocks are not used for decoding. If the dc component in the decoded data in a block is an error code, the error correction section 905 corrects the decoded data in the block and sends the result to the video signal output section 904. By operating decoding with error flags, errors can be corrected by the error correction section 905 without malfunction for data which have been subjected to error correction such as dc component replacement.

The present embodiments can solve disadvantages of a video signal recorder with variable length coding by using a relatively simple structure. Therefore, it can be used practically very effectively.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. For example, the blocks in the drawings may be embodies by software processing. In the present embodiment, 9 bits of a dc component is replaced with an error code. However, an error code may be expressed with 12 bits as a sum of a 9-bit dc component and a 3-bit control signal. In the present embodiment, an error is replaced on correction on a previous pixel. However, it may also be corrected by using a plurality of filters consisting of adjacent pixels. The invention can also be applied to recording formats and the recording apparatus other those explained above. The present invention can also be applied to a format having variable length recording areas as shown in FIG. 4.

What is claimed is:

1. A video recorder for reproducing and recording data, which data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes, which video recorder comprising:

a data reproduction means for reproducing the data from an error correction area;

an error detection means for detecting an error which cannot be corrected exists in data in an error correction area and for detecting a position of the error;

a replacement means for replacing either a dc component in the recording area or a codeword for a control data needed for decoding the data in a block with a prescribed codeword and for replacing a codeword for a first ac component with an end-of-block code if said error detection means detects in the block an error which cannot be corrected; and a recording means for recording data processed by said replacement means.

2. The recorder according to claim 1, wherein codewords for ac components are variable length codes.

3. The recorder according to claim 1, wherein said error correction means records an error flag when said error detection means detects in reproduced data in the unit of error correction area that an error which cannot be corrected exists in an error correction area;

which recorder further comprising a flag change means for changing the error flag with the prescribed codeword in data received by said dc component replacement means and for sending the data to said record means after changing the error flag.

4. The recorder according to claim 1, wherein said prescribed codeword is a codeword not generated in the orthogonal transformation.

5. The recorder according to claim 4, wherein said error correction means comprises an error pixel detection means for detecting a pixel signal having the prescribed codeword.

6. The recorder according to claim 1, further comprising:

a decoding means for a record area wherein said error detection means detects an error position for decoding data by using an end-of-block codeword which appears first in the record area or by using codewords for ac components included in the record area if an end-of-block codeword does not exist in the record area; and a correction means for correcting data in a block wherein said dc component replacement means replaces the dc component in the record area;

wherein said recording means records recording data processed by said replacement means.

7. The recorder according to claim 6, wherein said correction means replaces a pixel signal having a value not generated by said correction means usually with a pixel value at an adjacent position in the same field, in one or more fields before or after the present field.

8. A method for reproducing and recording video data, which data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes, which method comprising the steps of:

reproducing the data from an error correction area;

detecting an error which cannot be corrected exists in data in an error correction area and detecting a position of the error;

replacing either a dc component in the recording area or a codeword for a control data needed for decoding the data in a block with a prescribed codeword and for replacing a codeword for a first ac component with an end-of-block code if an error which cannot be corrected is detected in the block; and recording data processed by said replacement step.

9. The method according to claim 8, wherein codewords for ac components are variable length codes.

10. The method according to claim 8, wherein said prescribed codeword is a codeword not generated in the orthogonal transformation.

11. The method according to claim 8, wherein an error flag is set in the error correction step when it is detected in reproduced data in the unit of error correction area that an error which cannot be corrected exists in an error correction area, and the error flag is changed for the prescribed codeword before the recording step.

12. The method according to claim 8, further comprising the steps of:

decoding data by using an end-of-block codeword which appears first in the record area or by using codewords for ac components included in the record area if an end-of-block codeword does not exist in the record area, for a record area wherein an error position is detected; and correcting data in a block wherein the dc component in the record area is replaced.

13. A video recorder for reproducing and recording data, which data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes, which video recorder comprising:

a data reproduction means for reproducing the data from an error correction area;

an error detection means for detecting an error which cannot be corrected exists in data in an error correction area and for detecting the position of the error;

a replacement means for replacing either a dc component in the recording area or a codeword for a control data needed for decoding the block with a prescribed codeword and replacing a codeword for a first ac component with an end-of-block code for the block wherein said error detection means detects an error which cannot be corrected and the error is one of a dc component, control data needed for reproduction of the block and ac components at frequencies lower than a prescribed frequency;

an insertion means for inserting an end-of-block codeword for a block wherein said error detection means detects an error which cannot be corrected and the error is one of ac components higher than a prescribed frequency or an end-of-block codeword; and a recording means for recording data processed by said insertion means.

14. The recorder according to claim 13, wherein codewords for ac components are variable length codes.

15. The recorder according to claim 13, wherein said prescribed codeword is a codeword not generated in the orthogonal transformation.

16. The recorder according to claim 13, wherein said error correction means records an error flag when said error detection means detects in reproduced data in the unit of error correction area that an error which cannot be corrected exists in an error correction area;

which recorder further comprising a flag change means for changing the error flag with the prescribed codeword in data received by said dc component replacement means or inserted by said insertion means and for sending the data to said record means after changing the error flag.

17. A method for reproducing and recording data, which data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes, which method comprising the steps of:

reproducing the data from an error correction area;

detecting an error which cannot be corrected exists in data in an error correction area and detecting the position of the error;

replacing either a dc component in the recording area or a codeword for a control data needed for decoding the block with a prescribed codeword and replacing a codeword for a first ac component with an end-of-block code for the block wherein an error which cannot be corrected is detected and the error is one of a dc component, control data needed for reproduction of the block and ac components at frequencies lower than a prescribed frequency;

inserting an end-of-block codeword for a block wherein an error which cannot be corrected is detected and the error is one of ac components higher than a prescribed frequency or an end-of-block codeword; and recording data after inserting the end-of-block codeword.

18. The recorder according to claim 17, wherein codewords for ac components are variable length codes.

19. The method according to claim 17, wherein said prescribed codeword is a codeword not generated in the orthogonal transformation.

20. The method according to claim 17, wherein an error flag is set in the error correction step when it is detected in reproduced data in the unit of error correction area that an error which cannot be corrected exists in an error correction area, and the error flag is changed for the prescribed codeword before the recording step.

21. A reproducing apparatus for reproducing data, which data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes, by reproducing the data from an error correction area, by detecting an error which cannot be corrected exists in data in an error correction area and detecting a position of the error, by replacing either a dc component in the recording area or a codeword for a control data needed for decoding the data in a block by a prescribed codeword and for replacing a codeword for a codeword for a first ac component by an end-of-block code if an error which cannot be corrected is detected in the block, and by recording the data; which apparatus comprising:

a reproduction means for reproducing the data from an error correction area;

a detection means for detecting that the dc component has been replaced previously in an error correction area;

a decoding means for decoding by using an end-of-block codeword which appears in a record area on which said detection means detects that the dc component has been replaced previously or by using codewords included in a record area on which said detection means does not detects that the dc component has been replaced previously; and a correction means for correcting the data in a block on which the dc component has been replaced in the record area.

22. The reproducing apparatus according to claim 21, wherein codewords for ac components are variable length codes.

23. The reproducing apparatus according to claim 21, further comprising an error pixel detection means for detecting that a pixel signal corrected by said correction means with orthogonal transformation has a value which is not generated in orthogonal transformation.

24. The reproducing apparatus according to claim 21, wherein said correction means replaces a pixel signal having a value not generated by said correction means usually with a pixel value at an adjacent position in the same field, in one or more fields before or after the present field.

25. A method for reproducing data, which data have been recorded by constructing blocks made from adjacent pixels of input video signals, by obtaining orthogonal components by orthogonal transformation of the data for each block, by coding the orthogonal components for each block and control data needed for reproduction of the block including an end-of-block codeword for representing that ac components after the codeword are all zero, by arranging coded data for each block in prescribed record areas and by constructing an error correction area made of one or more record areas and coding the data in the error correction area as error correction codes, by reproducing the data from an error correction area, by detecting an error which cannot be corrected exists in data in an error correction area and detecting a position of the error, by replacing either a dc component in the recording area or a codeword for a control data needed for decoding the data in a block by a prescribed codeword and for replacing a codeword for a codeword for a first ac component by an end-of-block code if an error which cannot be corrected is detected in the block, and by recording the data; which method comprising the steps of:

reproducing the data from an error correction area;

detecting that the dc component has been replaced previously in an error correction area;

decoding by using an end-of-block codeword which appears in a record area on which it is detected that the dc component has been replaced previously or by using codewords included in a record area on which it is detected that the dc component has been replaced previously; and correcting the data in a block on which the dc component has been replaced in the record area.

* * * * *